United States Patent [19]
Eaton

[11] Patent Number: 5,854,849
[45] Date of Patent: Dec. 29, 1998

[54] MOBILE FILING SYSTEM WITH ACTIVE-PASSIVE OPERATOR SAFETY

[75] Inventor: David R. Eaton, Lomira, Wis.

[73] Assignee: Tab Products Company, Palo Also, Calif.

[21] Appl. No.: 811,634

[22] Filed: Mar. 5, 1997

[51] Int. Cl.⁶ .................................................... G06K 9/00

[52] U.S. Cl. .......................... 382/100; 211/162; 312/198

[58] Field of Search ................................... 382/100, 103, 382/218; 348/143, 152; 312/118, 198, 199, 201; 211/162

[56] References Cited

U.S. PATENT DOCUMENTS

| | | | |
|---|---|---|---|
| 4,988,189 | 1/1991 | Kroupa et al. | 356/4 |
| 5,160,190 | 11/1992 | Farrell et al. | 312/201 |
| 5,417,487 | 5/1995 | Dahnert | 312/201 |

OTHER PUBLICATIONS

What's New In Imaging, Fall/Winter 1993 Data Translation, Inc.

*Primary Examiner*—Andrew W. Johns
*Assistant Examiner*—Hieu C. Le
*Attorney, Agent, or Firm*—Donald Cayen

[57] ABSTRACT

A mobile filing system has an active and passive operator safety system that protects persons and objects in the aisles. The safety system comprises video cameras that view the aisles and the adjacent filed media. A series of images from the video cameras are captured at each of several selected aisle configurations when the aisles are supervised to assure that no persons or objects are in them. The images are stored in a computer. During operation of the mobile filing system, when the aisles are unsupervised, images of the filed media and the aisles are captured when a closing mobile carriage is at each of the selected aisle configurations. The corresponding images captured when the aisle was supervised and unsupervised at the respective aisle configurations are compared. If the compared images differ by more than a predetermined amount, the mobile carriage is prevented from rolling to further close the aisle.

15 Claims, 4 Drawing Sheets

MOBILE FILING SYSTEM WITH ACTIVE-PASSIVE OPERATOR SAFETY

BACKGROUND OF THE INVENTION

This invention pertains to safety systems for moving carriages, and more particularly to apparatus that controls the closing of the aisles of mobile filing systems.

DESCRIPTION OF THE PRIOR ART

Various equipment has been developed to protect persons and objects associated with the use of mobile filing systems. Such equipment is necessary to assure that no person or object in an aisle of the filing system is harmed when the aisle is closed.

Safety devices used with mobile filing systems include safety sweeps or switch bars as shown in U.S. Pat. Nos. 4,733,923 and 4,743,078; safety floors as shown in U.S. Pat. Nos. 4,693,184 and 4,744,307; and a combination safety sweeps and floor as shown in U.S. Pat. No. 4,745,516. Other prior safety devices include a motion detector described in U.S. Pat. No. 5,160,190 and an acoustic wave generator and transmitter disclosed in U.S. Pat. No. 4,029,176. U.S. Pat. Nos. 5,121,975; 5,359,191; and 5,427,444 describe different versions of photoelectric sensors. For various reasons, all of the foregoing safety devices are limited in their effectiveness.

U.S. Pat. No. 5,417,487 teaches a presence detector that utilizes a motion detector activated by a heat source to detect the presence of a person in an aisle. Using a heat based safety system has two major disadvantages. The first is that an opaque object, such as a briefcase carried by the person or a cart or the like in the aisle, can block the detector from sensing the source of heat. In addition, an inanimate object, such as a cart or book, in the aisle cannot be detected by the motion sensor. Accordingly, the detector of the U.S. Pat. No. 5,417,487 cannot prevent an aisle from closing on an inanimate object.

Thus, despite the large number of safety systems presently available for mobile filing systems, further developments are highly desirable.

SUMMARY OF THE INVENTION

In accordance with the present invention, a mobile filing system with active-passive operator safety is provided that protects both objects and active or passive persons using the filing system. This is accomplished by apparatus that includes a safety system that captures and compares supervised and operational images produced of the aisles of the mobile filing system.

The safety system comprises one or more video cameras that view all the aisles of the mobile filing system. Mobile filing systems with exceptionally long aisles may require two video cameras for each aisle. Selected images viewed by each video camera of the associated aisle under supervised conditions are captured by a frame grabber. The images of the supervised aisle are captured at selected configurations of the aisle ranging from fully opened to almost fully closed. The various aisle configurations are defined as percentages of the total time required for a mobile carriage to change the adjacent aisle from being fully opened to being fully closed. The images captured of the supervised aisle are processed into digital images that are enhanced, measured, and classified. According to one aspect of the invention, the captured images are digitized into respective patterns of pixels that represent the appearances of the empty aisle at the selected configurations. The digitized pixels are stored in the memory of a system computer.

When the mobile filing system is in an operational mode, the video camera continuously produces images of the associated aisle. If the aisle is fully closed or is opening, the safety system of the invention exercises no control over the mobile carriages that affect that aisle. Similarly, if the aisle is fully opened but the appropriate mobile carriages are not energized to close the aisle, the safety system does not affect mobile carriage operation. However, immediately upon generation of a signal that will result in the aisle starting to close, the frame grabber of the safety system captures the image present in the video camera. That image is digitized and fed to the computer. A compare operation is performed on the operational image against the corresponding supervised image. If the pixel count difference between the two images is more than a predetermined allowed percentage, the safety system prevents the appropriate mobile carriage from moving to close the aisle. If the pixel count difference is within the tolerance, the mobile carriage is enabled to move. Additional operational images from the video camera are captured by the frame grabber at the configurations of the closing aisle that correspond to the selected aisle configurations at which the supervised images were captured. Each operational image is compared with the corresponding supervised image. If at any of the aisle configurations the percentage of pixel count difference between the corresponding operational and supervised images is outside of the allowed tolerance, the safety system instructs the appropriate mobile carriage to stop moving.

The method and apparatus of the invention, using a video camera and a frame grabber, thus tests a mobile filing storage aisle for the presence or absence of persons or objects therein. Images representative of the operational aisle are compared with corresponding images representative of an empty aisle at various configurations of a closing aisle to stop mobile carriage movement if a person or object is in the aisle.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
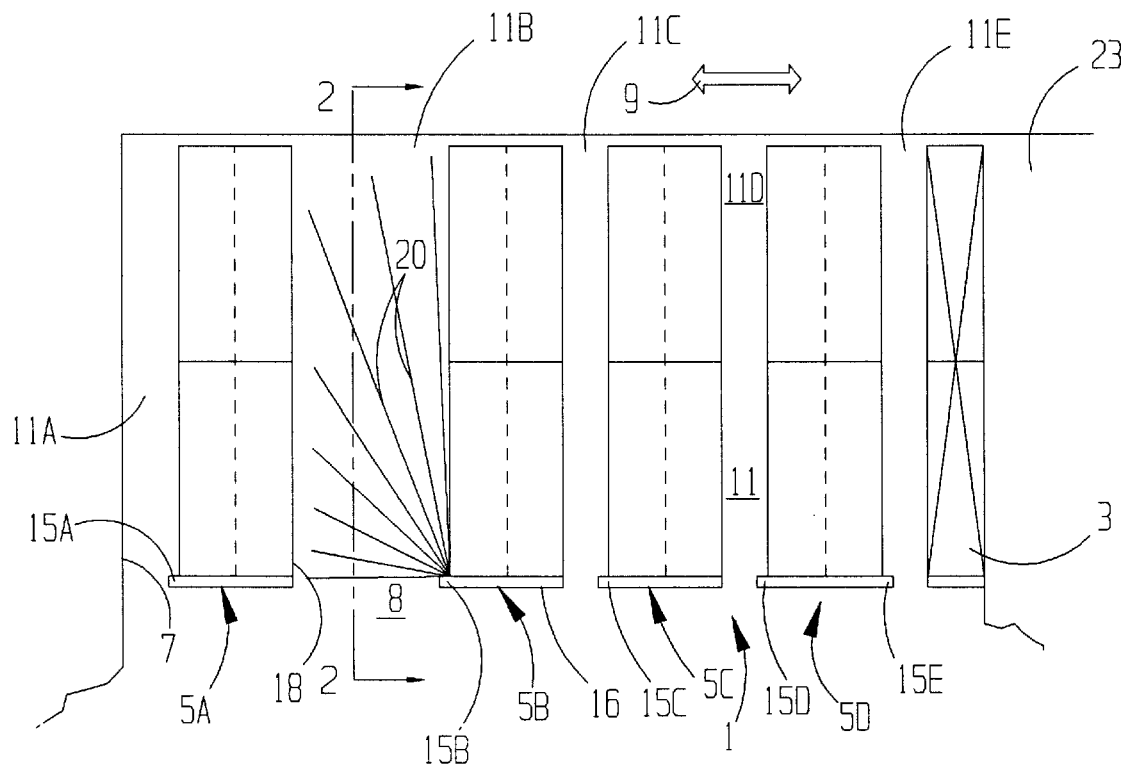
FIG. 1 is a top view of a typical mobile filing system that includes the present invention.

Referring to FIG. 1, a mobile filing system 1 is illustrated that includes the present invention. The particular mobile filing system 1 shown has a stationary end storage shelving 3 and four electrically powered mobile carriages 5A–5D. The mobile carriages 5A–5D are located between the stationary shelving 3 and a vertical wall 7 of the building that houses the mobile filing system. However, persons skilled in the art will recognize that the mobile filing system can have numerous other combinations and relative placements of stationary shelving and mobile carriages. The mobile carriages roll along the building floor 8 in the directions of arrows 9 between the wall 7 and the stationary shelving. Rolling of the mobile carriages causes aisles 11A–11E to open and close.

The building end wall 7 is solid painted with no mechanical extrusions or protrusions. Alternately, the end wall may be covered with a solid colored curtain. A back wall 23 of the building is also of a solid color. The stationary shelving 3 and the mobile carriages 5A–5D are loaded with various media typical of normal and well known use of mobile filing systems.

Figure 2:
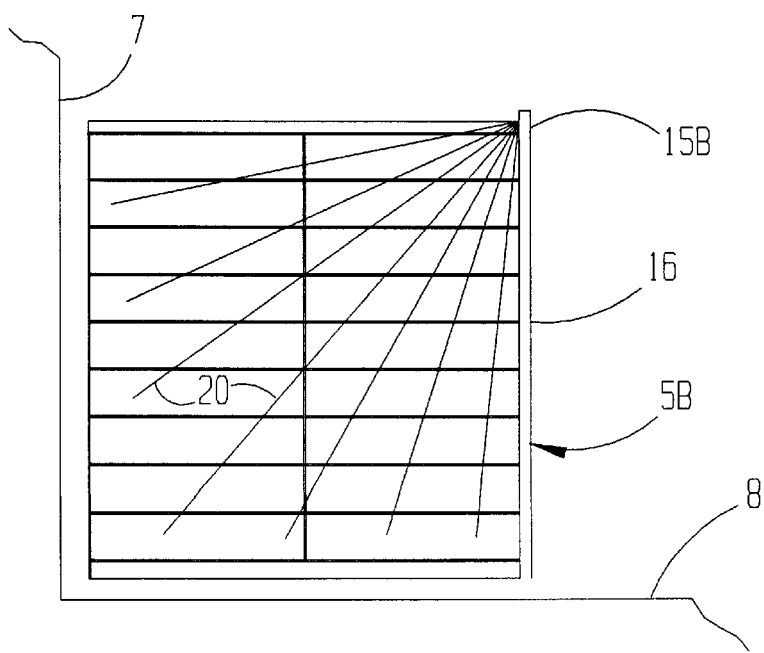
FIG. 2 is a view taken along line 2—2 of FIG. 1 and rotated 90 degrees counterclockwise.
Figure 5:
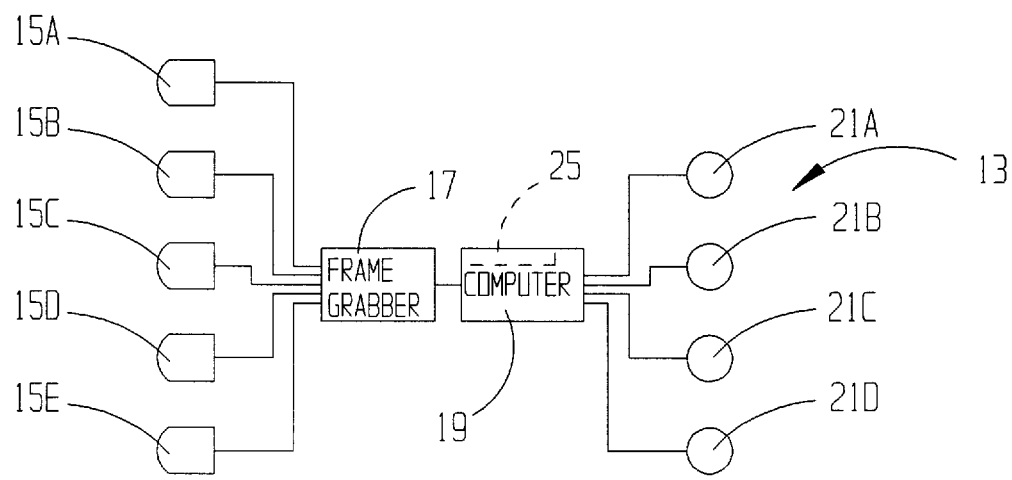
FIG. 5 is a schematic drawing of the safety system of the present invention.

In accordance with the present invention, and also looking at FIGS. 2 and 5, active-passive operator safety for the mobile filing system 1 is provided by a safety system 13. The safety system 13 detects the presence or absence of a person or object in any of the aisles 11A–11E. In the illustrated construction, the safety system is comprised of video cameras 15A–15E for the respective aisles 11A–11E. The video cameras 15A–15E are preferably mounted to the mobile carriages 5A–5D such that all of the corresponding open aisles are within the range of view of the cameras. For example, the entire open aisle 11B is within the range of view of the video camera 15B. For that purpose, the lens view of the video camera 15B is adjusted to view from the adjacent edge 16 of the mobile carriage 5B and is angled straight downwardly toward the floor 8. The video camera lens view is further adjusted to include the end 18 of the adjacent mobile carriage 5A and also the media filed in the adjacent mobile carriage when the aisle 11B is fully opened. Such lens view is represented by lines 20.

The video cameras 15A–15E are connected electrically to a frame grabber 17. The frame grabber is controlled by a computer 19. The computer 19 also controls electric motors 21A–21D that drive the respective mobile carriages 5A–5D.

Figure 3:
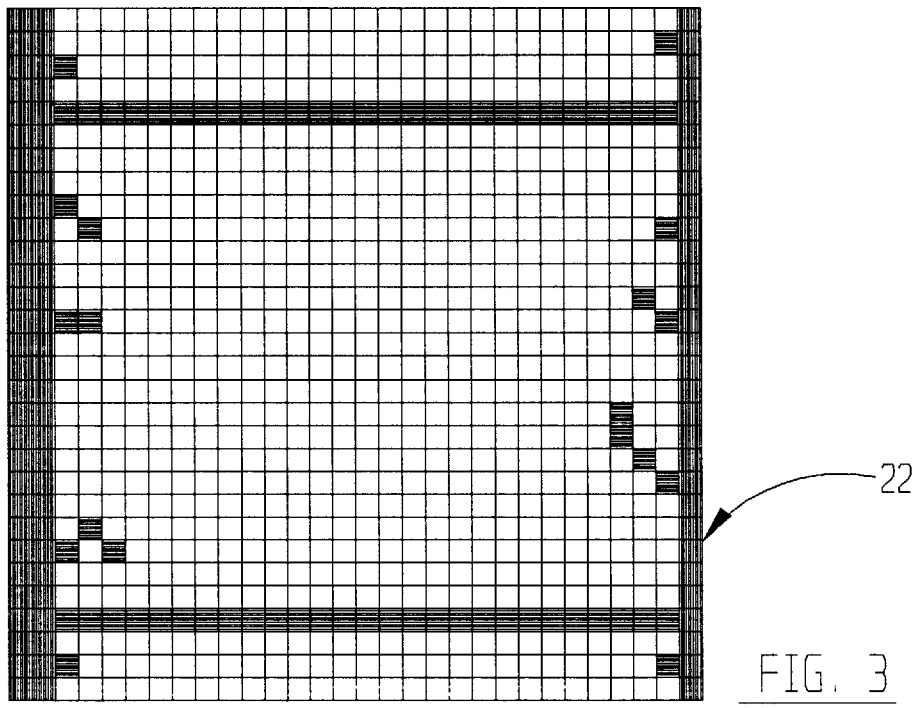
FIG. 3 is a view in digital format of a typical view of a mobile filing system aisle taken in a supervised mode.

To use the mobile filing system 1 with the safety system 13, the motors 21A–21D are initially operated such that an aisle 11, such as aisle 11B, is fully opened. The mobile filing system is placed in a supervised mode in which a person visually checks to be certain that no object or person is in the aisle 11B. The video camera 15B is on continuously. The frame grabber 17 is operated to capture an image of the opened and supervised aisle from the video camera 15B. That image is converted into digitized pixels, as is typically shown as image 22 in FIG. 3. The digitized image 22 is fed to the computer 19 for storage in its memory 25.

While still in the supervised mode, the mobile carriage 5A and/or 5B is controlled to move so as to close the aisle 11B. The time for complete closure, as, for example, ten seconds, is measured and stored in the computer memory 25.

From the fully opened configuration of the aisle 11B and with the mobile filing system 1 in the supervised mode, the mobile carriage 5B is driven by the motor 21B to close the aisle. The computer 19 instructs the frame grabber 17 to capture additional images taken by the video camera 15B at selected configurations of the closing aisle. For example, images may be captured at 33 percent, 66 percent, and 90 percent of complete aisle closure. The actual aisle configurations at which the images are captured are determined by the corresponding percentages of the total time required to close the aisle from its fully opened configuration. For example, if ten seconds are required to close the open aisle 11B, the computer instructs the frame grabber to capture images at 3.3 seconds, 6.6 seconds, and 9 seconds after a mobile carriage 5B is started to close the aisle. The captured images are digitized and fed to the computer memory 25 for storage. The process is repeated for each of the aisles 11A and 11C–11E and their associated video cameras 15A and 15C–15E.

After all the desired images associated with the supervised aisles 11A–11E have been captured, digitized, and stored, the mobile filing system 1 is set to an operational mode. Persons operating and using the mobile filing system are then allowed to enter, open, and close the aisles as needed to obtain access to the media stored in the stationary shelving 3 and in the mobile carriages 5A–5D.

Figure 4:
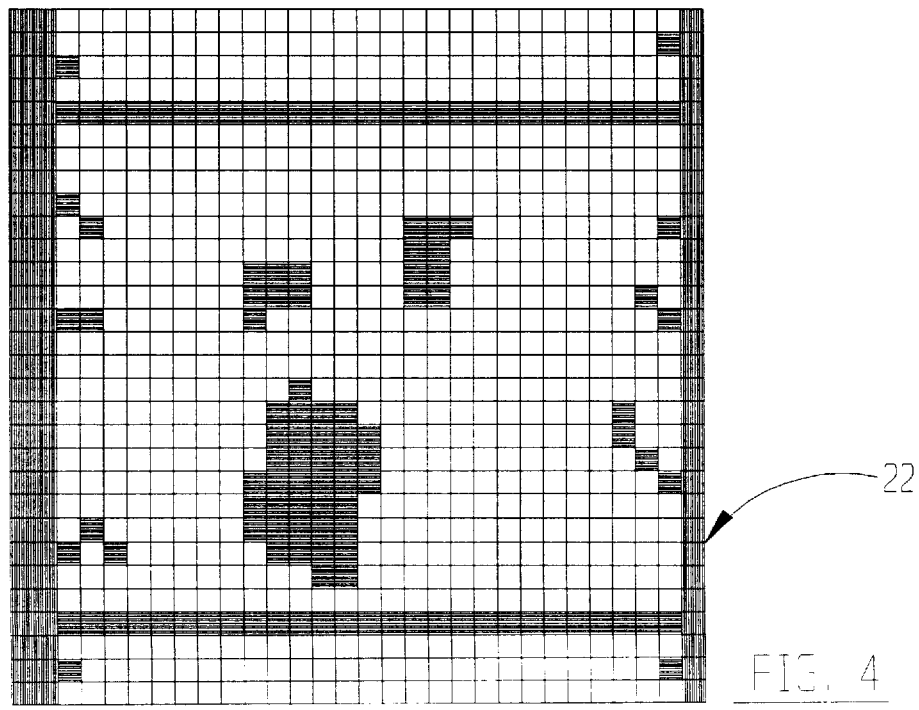
FIG. 4 is a view similar to FIG. 3, but showing a typical view of an aisle taken in an operational mode.

Immediately upon a person giving a command that results in a mobile carriage 5A–5D rolling in a direction that tends to close an aisle, the computer 19 signals the frame grabber 17 to capture the image of that aisle as viewed by the associated video camera. The newly captured image of the aisle with the mobile filing system in the operational mode is processed into digitized pixels. A typical operational image of a fully opened aisle is shown as image 24 in FIG. 4. The operational image 24 is immediately fed to the computer. There a boolean algebra compare operator is performed on the operational image against the corresponding image 22 taken during the supervised mode. If there is a pixel count difference greater than an allowed percentage, the computer prevents the associated mobile carriage motor 21 from moving the mobile carriage. On the other hand, if the percentage count of pixels in the operational image is within the allowed tolerance, the computer enables the mobile carriage motor to run. It is contemplated that a five percent tolerance in pixel count will give satisfactory results for most mobile filing systems. That tolerance in pixel count is designed to allow for adding, changing, or deleting media filed in the various mobile carriages and stationary shelving 3 without having to repeat the supervised mode routine. The tolerance is set to assure that a "stop/out of tolerance" results if a person or object, such as a cart or ladder, is in the aisle to be closed. If that situation exists, the operational image pixel count would be significantly different than the corresponding supervised image pixel count.

Assuming the operational image 24 of the fully opened aisle as captured by the frame grabber 17 is within the specified pixel count tolerance compared with the corresponding supervised image 22, the mobile carriage 5 rolls until the aisle is, for the example given previously, 67 percent open. At that point, the computer 19 again instructs the frame grabber to capture an image as viewed by the video camera 15. The compare process is repeated. Additional images are captured and compared when the aisle is 34 percent and 10 percent open. The multiple capture-and-compare routines protect a person who enters the aisle, or who is detected climbing on the mobile carriage or stationary shelving 3, after the aisle has started to close.

Figure 6:
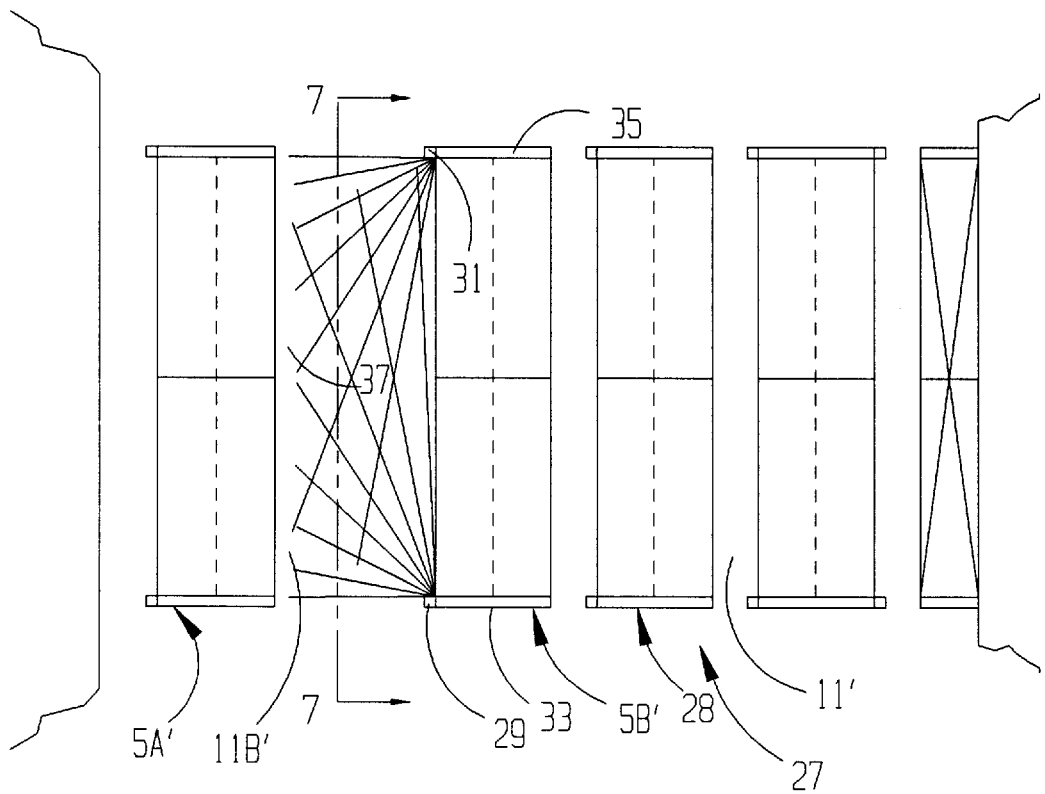
FIG. 6 is a top view of a mobile filing system having dual entry directions.
Figure 7:
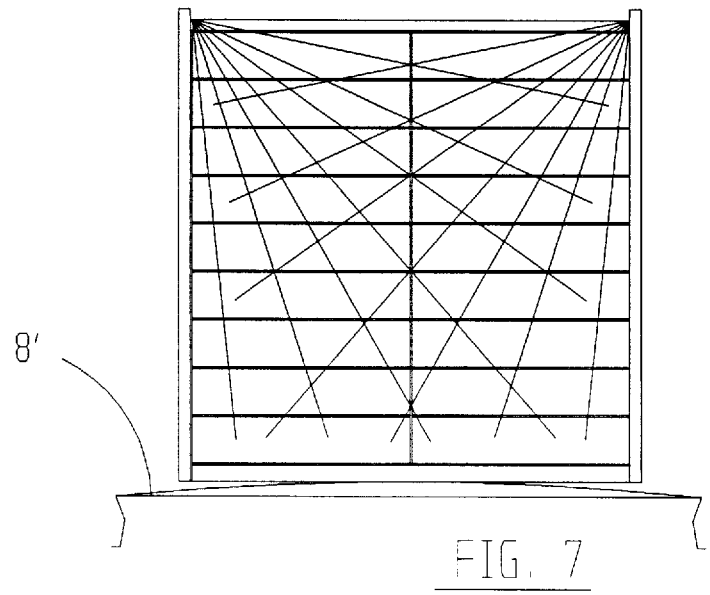
FIG. 7 is a view taken along line 7—7 of FIG. 6 and rotated 90 degrees counterclockwise.

Now turning to FIGS. 6 and 7, a mobile filing system 27 having dual access is shown. The mobile filing system 27 is generally similar to the mobile filing system 1 described previously in connection with FIGS. 1 and 2. However, the dual access mobile filing system has no side wall on either end of the mobile carriages 28. Persons and objects are thus able to enter the aisles 11' from both ends. In that situation, it is preferred that there be two video cameras, such as cameras 29 and 31, to view each aisle 11'. The lens views of the video cameras 29 and 31 are adjusted to scan from the respective adjacent ends 33 and 35 of the mobile carriage 5B' and are angled straight down to the floor 8'. The video cameras are further adjusted to include the opposite end 37 of and the media filed in the adjacent mobile carriage 5A' when the aisle 11B' is fully opened. The lens views are schematically represented by lines 39. The dual video cameras are multi-plexed and synchronized so as to function as a single camera.

In summary, the results and advantages of mobile filing systems can now be more fully realized. The safety system 13 offers complete active and passive safety for persons using the mobile filing system, whether they are entering, sitting, standing still, or climbing. This desirable result comes from using the combined functions of the video cameras 15 and the frame grabber 17. Images from the video cameras of supervised aisles 11 are captured at selected aisle configurations during aisle closure. The captured supervised images are stored as digitized pixels. They are later compared with corresponding images captured at the same aisle configurations when the mobile filing system is in an operational mode. If the comparison results in a percentage count of pixels that is out of a predetermined tolerance, motion of the mobile carriage that causes closure of the aisle is prevented. The safety system further protects objects left in the aisle, such as carts and ladders, and also filed media that have fallen from a mobile carriage shelf.

It will also be recognized that in addition to the superior performance of the present invention, its construction is such as to cost little if any more than traditional safety systems for mobile filing systems. Also, since mechanical components are virtually non-existent, the need for maintenance is minimal.

Thus, it is apparent that there has been provided, in accordance with the invention, a mobile filing system with active-passive operator safety that fully satisfies the aims and advantages set forth above. While the invention has been described in conjunction with specific embodiments thereof, it is evident that many alternatives, modifications, and variations will be apparent to those skilled in the art in light of the foregoing description. For example, images of a closing aisle may be captured when the aisle is 75 percent, 50 percent, and 25 percent closed rather than at the aisle configurations previously disclosed. Accordingly, it is intended to embrace all such alternatives, modifications, and variations as fall within the spirit and broad scope of the appended claims.

I claim:

1. A mobile filing system comprising:
   a. carriage means rollable along a floor for selectively and closing an aisle;
   b. camera means for continuously viewing and producing images of the aisle;
   c. grabber means for capturing selected first and second images from the camera means; and
   d. computer means for instructing the grabber means to capture the first and second images, storing the first image, comparing the second image with the first image, and preventing rolling of the carriage means to close the aisle in response to the first and second images having more than a predetermined difference between them.

2. The mobile filing system of claim 1 wherein:
   a. the camera means comprises at least one video camera mounted on the carriage means;
   b. the computer means instructs the grabber means to capture the first image when the aisle is in a fully opened configuration and the mobile filing system is in a supervised mode in which no person or object is in the aisle; and
   c. the computer means instructs the grabber means to capture the second image when the aisle is in a fully opened configuration and the mobile filing system is in an operational mode in which a person or object may be in the aisle.

3. The mobile filing system of claim 2 wherein:
   a. the computer means instructs the grabber means to capture at least one third image from the video camera when the aisle is at a first partially closed configuration and the mobile filing system is in the supervised mode;
   b. the computer means instructs the grabber means to capture at least one fourth image from the video camera when the aisle is in the first partially closed configuration and the mobile filing system is in the operational mode; and
   c. the computer means compares the third and fourth images and prevents rolling of the carriage means in response to the third and fourth images having more than a predetermined difference between them.

4. The mobile filing system of claim 2 wherein:
   a. the computer means instructs the grabber means to capture an image from the video camera when the aisle is at each of a plurality of selected partially closed configurations and the mobile filing system is in the supervised mode;
   b. the computer means instructs the grabber means to capture an image from the video camera when the aisle is at each of the plurality of the selected partially closed configurations and the mobile filing system is in the operational mode; and
   c. the computer means compares the corresponding images captured in the supervised and operational modes for each of the selected partially closed configurations and prevents rolling of the carriage means in response to the corresponding images captured in the supervised and operational modes having more that a predetermined difference between them.

5. Apparatus for filing selected media comprising:
   a. at least one mobile carriage in which the selected media is filed;
   b. motor means for rolling the mobile carriage along a floor to open and close an aisle adjacent the mobile carriage in response to receiving a command;
   c. camera means mounted to the mobile carriage for continuously producing images of the aisle;
   d. grabber means for capturing selected images from the camera means; and
   e. computer means for storing and comparing the selected images captured by the grabber means, and for commanding the motor means to enable or prevent rolling of the mobile carriage in response to the comparison of the selected images.

6. The apparatus of claim 5 wherein:
   a. the apparatus further comprises shelving means for filing selected media proximate the mobile carriage, the aisle being between the mobile carriage and the shelving means; and
   b. the camera means continuously produces images of the media filed in the shelving means.

7. The apparatus of claim 6 wherein:

a. the grabber means captures a first image of the media filed in the shelving means and of the aisle when the aisle is in a fully opened configuration and the aisle is supervised to assure no person or object is in the aisle, and a second image of the media filed in the shelving means and of the aisle when the aisle is in a fully opened configuration and the aisle is operational such that a person or object may be in the aisle; and b. the computer means compares the first and second images and commands the motor means to enable rolling of the mobile carriage to close the aisle in response to the second image having less than a predetermined difference from the first image.

8. The apparatus of claim 7 wherein:

a. the grabber means captures images of the media filed in the shelving means and of the aisle when the aisle is at multiple selected partially opened configurations and the aisle is supervised;

b. the grabber means captures images of the media filed in the shelving means and of the aisle when the aisle is at the multiple selected partially opened configurations and the aisle is operational; and c. the computer means compares the images captured when the aisle is supervised with the images taken at the corresponding aisle configurations when the aisle is operational and commands the motor means to enable rolling of the mobile carriage to close the aisle in response to the corresponding images having less than a predetermined difference between them.

9. A method of protecting persons and objects associated with a mobile filing system having at least one mobile carriage comprising the steps of:

a. rolling the mobile carriage to fully open an aisle adjacent the mobile carriage;

b. continuously producing video images of the aisle;

c. supervising the aisle to assure no person or object is in the aisle;

d. capturing a first image of the open supervised aisle and storing the first image;

e. removing supervision of the aisle and thereby enabling persons and objects to be in the aisle;

f. commanding the mobile carriage to roll to close the aisle and immediately capturing a second image of the open unsupervised aisle;

g. comparing the second image with the first image; and h. enabling the mobile carriage to roll to close the aisle in response to the second image having less than a predetermined difference from the first image.

10. The method of claim 9 wherein the step of continuously producing video images of the aisle comprises the steps of:

a. filing media on the opposite side of the aisle as the mobile carriage; and b. continuously producing images of the filed media.

11. The method of claim 9 comprising the further steps of:

a. supervising the aisle;

b. rolling the mobile carriage to a first partially open aisle configuration;

c. capturing a third image of the aisle at the partially opened supervised configuration and storing the third image;

d. rolling the mobile carriage to fully open the aisle;

e. removing supervision of the aisle;

f. rolling the mobile carriage to the first partially opened aisle configuration;

g. capturing a fourth image of the unsupervised aisle at the first partially opened configuration thereof;

h. comparing the fourth image with the third image; and i. enabling the mobile carriage to roll and further closing the aisle in response to the fourth image having less than a predetermined difference with the third image.

12. The method of claim 9 comprising the further steps of:

a. returning supervision to the aisle;

b. rolling the mobile carriage to each of a plurality of different partially opened aisle configurations;

c. capturing a supervised image at each of the respective partially opened aisle configurations and storing each of the supervised images;

d. removing supervision of the aisle;

e. rolling the mobile carriage to a selected one of the partially opened aisle configurations;

f. capturing an operational image at the selected one of the partially opened aisle configurations;

g. comparing the operational image captured at the selected partially opened aisle configuration with the supervised image captured at the corresponding selected partially opened aisle configuration; and h. enabling the mobile carriage to roll and further closing the aisle in response to the operational image having less than a predetermined difference with the corresponding supervised image.

13. In a mobile filing system having shelving that files selected media therein and a mobile carriage that cooperates with the shelving to open and close an aisle therebetween in response to rolling of the mobile carriage, a method of safely controlling the mobile carriage comprising the steps of:

a. continuously producing video images of the aisle and of the filed media;

b. supervising the aisle and assuring that no person or object is in the aisle;

c. rolling the mobile carriage to a first aisle configuration;

d. capturing a supervised image of the aisle and of the filed media at the first aisle configuration;

e. removing supervision of the aisle and thereby enabling persons and objects to enter the aisle;

f. capturing an operational image of the aisle and of the filed media at the first configuration of the aisle;

g. comparing the supervised and operational images taken at the first aisle configuration; and h. enabling the mobile carriage to roll and closing the aisle in response to the supervised and operational images having less than a predetermined difference between them.

14. The method of claim 13 wherein the step of rolling the mobile carriage to a first aisle configuration comprises the step of rolling the mobile carriage to fully open the aisle.

15. The method of claim 14 comprising the further steps of:

a. returning supervision to the aisle;

b. rolling the mobile carriage to a second aisle configuration whereat the aisle is at least ten percent open;

c. capturing a second supervised image of the filed media and of the aisle at the second configuration thereof;

d. removing supervision of the aisle;

e. rolling the mobile carriage to open the aisle to a configuration greater than ten percent open;

f. rolling the mobile carriage to the second aisle configuration;

g. capturing a second operational image of the filed media and of the aisle at the second aisle configuration; and h. enabling the mobile carriage to roll and further closing the aisle in response to the second supervised image having less than a predetermined difference with the second operational image.

* * * * *